US012602248B2

(12) United States Patent
     Mutalik et al.

(10) Patent No.:      US 12,602,248 B2
(45) Date of Patent:         Apr. 14, 2026

(54) METHOD AND DEVICE OF LAUNCHING AN APPLICATION IN BACKGROUND

(71) Applicant: Samsung Electronics Co., Ltd.,
                  Suwon-si (KR)

(72) Inventors: Sripurna Mutalik, Bengaluru (IN);
                 Manith Shetty, Bengaluru (IN);
                 Anuradha Kanukotla, Bengaluru (IN);
                 Kwanjin Jung, Suwon-si (KR);
                 Wonseo Choi, Suwon-si (KR)

(73) Assignee: Samsung Electronics Co., Ltd.,
                Suwon-si (KR)

( * ) Notice:    Subject to any disclaimer, the term of this patent is extended or adjusted under 35 U.S.C. 154(b) by 826 days.

(21) Appl. No.: 17/841,053

(22) Filed:      Jun. 15, 2022

(65)                Prior Publication Data

US 2022/0308922 A1      Sep. 29, 2022

Related U.S. Application Data

(63)    Continuation      of      application      No.
        PCT/KR2021/000355, filed on Jan. 11, 2021.

(30)         Foreign Application Priority Data

Jan. 10, 2020     (IN) ............................. 202041001237
   Jan. 8, 2021      (IN) ............................. 2020 41001237

(51)  Int. Cl.
      G06F 9/48          (2006.01)
      G06F 9/50          (2006.01)
(52)  U.S. Cl.
      CPC .......... G06F 9/4881 (2013.01); G06F 9/5038
                  (2013.01); G06F 9/5094 (2013.01)

(58) Field of Classification Search
     None
     See application file for complete search history.

(56)                References Cited

U.S. PATENT DOCUMENTS 9,508,040 B2    11/2016  Bilal et al.
  2013/0212334 A1    8/2013   Michalak et al.
                     (Continued)

FOREIGN PATENT DOCUMENTS

WO         2019/082042 A1     5/2019
  WO         2019/171237 A1     9/2019

OTHER PUBLICATIONS

Mi 10 Pro vs S20 Ultra—SPEED Test www.youtube.com/watch?
v=khGlgaCHutA (timeline 6:00~6:10).
                     (Continued)

*Primary Examiner* — Eric C Wai
(74) *Attorney, Agent, or Firm* — Jefferson IP Law, LLP

(57)                 ABSTRACT
A method for managing application launching in an electronic device is provided. The method includes identifying a plurality of user interaction parameters and a plurality of hardware parameters of the electronic device, identifying, based on the plurality of user interaction parameters and the plurality of hardware parameters, an optimal time to pre-launch an application in a background, identifying at least one next probable application to be launched, pre-launching the at least one next probable application in the background at the optimal time, detecting at least one event to launch the at least one second application in the foreground, and launching the at least one second application in the foreground based on a user input.

16 Claims, 11 Drawing Sheets

(56) References Cited

U.S. PATENT DOCUMENTS

| 2015/0324137 | A1 | 11/2015 | Wu et al. | |
| 2016/0364272 | A1 | 12/2016 | Hou et al. | |
| 2018/0293087 | A1 | 10/2018 | Lee et al. | |
| 2019/0155619 | A1* | 5/2019 | Chen | ...................... G06N 3/044 |
| 2019/0347107 | A1 | 11/2019 | Ma et al. | |

OTHER PUBLICATIONS

Phone XS Max vs. Galaxy Note 9 Speed Test www.youtube.com/watch?v=OgqUjqbXMZA (timeline 4:18).
Indian Office Action dated Jan. 5, 2022, issued in Indian Application No. 202041001237.

\* cited by examiner

METHOD AND DEVICE OF LAUNCHING AN APPLICATION IN BACKGROUND

CROSS-REFERENCE TO RELATED APPLICATION(S)

This application is a continuation application, claiming priority under § 365(c), of an International application No. PCT/KR2021/000355, filed on Jan. 11, 2021, which is based on and claims the benefit of an Indian Provisional patent application number 202041001237, filed on Jan. 10, 2020, in the Indian Intellectual Property Office, and of an Indian Complete patent application number 202041001237, filed on Jan. 8, 2021, in the Indian Intellectual Property Office, the disclosure of each of which is incorporated by reference herein in its entirety.

BACKGROUND

1. Field

The disclosure relates to improving launch time of an application by achieving zero-lag condition. More particularly, the disclosure relates to a method and device of launching an application in background.

2. Description of Related Art

The first impression a user has of any application in an electronic device is the time taken for it to start. If the applications take too long to show something useful on the electronic devices, it may frustrate the users, affecting a brand value of the electronic device. The user of the electronic device may possibly switch to competitor brands.

Testers also use application launch time as a metric to compare electronic devices of different brands, hence slow application launch can tarnish the brand name Thus, even if hardware specification of the electronic device of a certain brand are excellent, slow launch time of application in the electronic device may be damaging to the brand value.

Thus, it is very essential to reduce the launch time of an application on the electronic device.

Conventional methods of application launching do not take into consideration memory available in the electronic device while launching the application. It may happen that enough memory may not be available at the instant of launching the application, which may increase the launching time. In another scenario, extra memory may be available, but the application being launched is not using the memory and the launch time is slow. Thus, there may be over or under utilization of the memory.

Hence, it is necessary to reduce the launch time of an application by considering the memory available in the electronic device for efficient utilization of the memory.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for managing application launching in an electronic device. The method includes identifying a plurality of user interaction parameters and a plurality of hardware parameters of the electronic device, identifying, based on the plurality of user interaction parameters and the plurality of hardware parameters, an optimal time to pre-launch an application in a background, identifying at least one next probable application to be launched, pre-launching the at least one next probable application in the background at the optimal time, and launching the at least one next probable application in a foreground based on a user input.

Additional aspects will be set forth in part in the description which follows and, in part, will be apparent from the description, or may be learned by practice of the presented embodiments.

The method further includes pre-launching, by the electronic device, the at least one second application in the background at the optimal time, retaining, by the electronic device, the at least one second application in the background in a state specific to the at least one second application, detecting, by the electronic device, at least one event to launch the at least one second application in the foreground, and launching, by the electronic device, the at least one second application in the foreground in response to detecting the event.

In an embodiment, the plurality of user interaction parameters includes at least one of a number of times the user touches a screen of the electronic device, an orientation of a User Interface (UI) of the electronic device, and a focused application. The plurality of hardware parameters includes an on/off time of a screen of the electronic device, an amount of memory available in the electronic device, and a temperature of the electronic device.

In an embodiment, determining, by the electronic device, an optimal time to pre-launch the at least one second application in background includes inputting, by the electronic device, the plurality of monitored user interaction parameters and the plurality of hardware parameters to the pre-trained on device model, determining, by the electronic device a normalized values for each of the user interaction parameters and each of the hardware parameters to a common scale using the pre-trained on device model, calculating, by the electronic device, a score of the normalized value for each of the user interaction parameter and each of the hardware parameter using the pre-trained on device model, determining, by the electronic device, whether the score meets a threshold, and selecting, by the electronic device, the optimal time to pre-launch the at least one second application in background in response to determining that the score meets the threshold.

In another embodiment, pre-launching the at least one second application in background further includes overriding, by the electronic device, a request focus command while pre-launching the at least one second application in background, hiding, by the electronic device, a starting window for the at least one second application and removing a recent menu entry of the at least one second application, disabling, by the electronic device, a sound, a vibration and a notification for the at least one second application, and removing, by the electronic device, the at least one second application launched in the background, from a history of past launched application in the electronic device after an application process is created.

In an embodiment determining the specific state in which the at least one second application is to be retained in background includes determining, by the electronic device, a current memory availability of the electronic device and a size of the at least one second application, determining, by the electronic device, whether the at least one second application refreshes at least one of a User Interface (UI) of the at least one second application and a database of the at least one second application, defining, by the electronic device, a paused state, a stopped state and a finished state for retaining the at least one second application based on the current memory availability of the electronic device, the size of the at least one second application and the refreshing of at least one of the UI and the database of the at least one second application and selecting, the paused state for retaining the at least one second application in background, in response to determining that the at least one second application meets a first size criteria does not refreshes the UI and the database of the at least one second application.

In another embodiment, the finished state is selected for retaining the at least one second application in background, in response to determining that the at least one second application meets a first size criteria and refreshes the database of the at least one second application, or the at least one second application meets a second size criteria and refreshes the database of the at least one second application, or the at least one second application meets a third size criteria.

In yet another embodiment, the stopped state is selected for retaining the at least one second application in background, in response to determining that the at least one second application meets a first size criteria, does not refreshes the database of the at least one second application and refreshes the UI of the at least one second application, or the at least one second application meets a second size criteria and does not refreshes the database of the at least one second application.

Another aspect of the disclosure provides an electronic device for managing the plurality of application comprising a memory configured to store at least one instruction, and at least one processor. The processor is configured to execute the at least one instruction to identify a plurality of user interaction parameters and a plurality of hardware parameters of the electronic device, determine an optimal time to pre-launch an application in a background, identify at least one next probable application to be launched, pre-launch the at least one next probable application in the background at the optimal time, and launching the at least one next probably application in the foreground based on a user input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
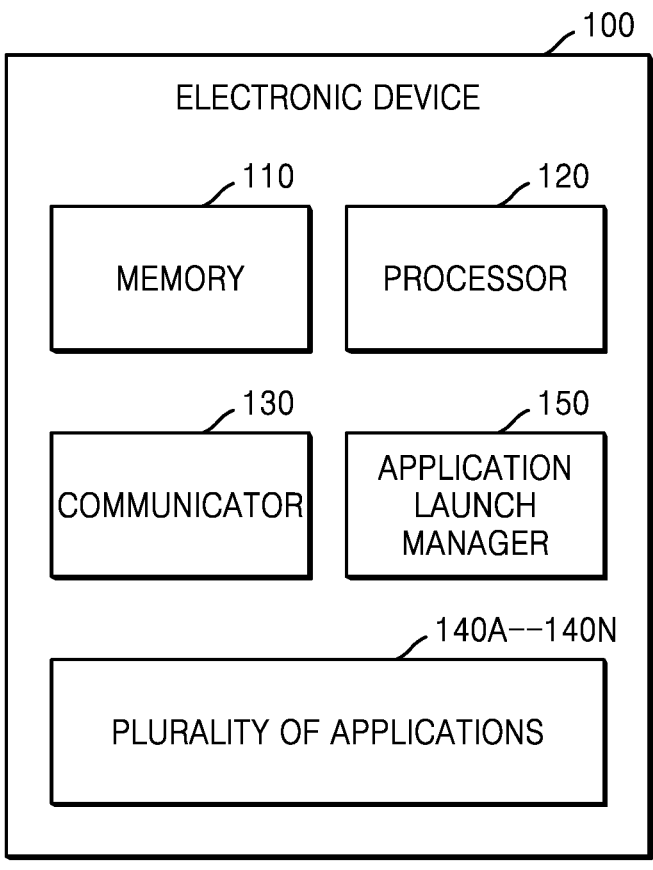
FIG. 1A illustrates a block diagram of an electronic device for managing launch of the plurality of electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and of managing launching of an application in an electronic device. In an embodiment, the electronic device monitors the application running on the electronic device in foreground and determines user interaction parameters and hardware parameters of the electronic device. The electronic device then receives a next probable application which is to be launched on the electronic device. An optimal time is determined for pre-launching the next probable application in background. The next probable application is then pre-launched in the background at the optimal time. At a later stage, the electronic device launches the next probable application in foreground upon receiving an event.

In an embodiment, the next probable application is retained in a specific state based on the requirements of the next probable application and memory available in the electronic device. Thus, by pre-launching the next probable application in background, the launching time of the next probable application for the user in foreground is decreased and a zero lag condition is achieved.

Unlike existing methods and systems, the proposed method ensures zero-lag for launch of the application. The proposed method takes into account the available memory and efficiently uses the available memory for pre-launching the next probable application in background while another application may be running in foreground.

Thus, the proposed method for managing launch of the next probable application not only reduces the latency but also ensures efficient utilization of the memory in the electronic device.

Referring now to the drawings, and more particularly to FIGS. 1A, 1B, 2, 3, 4, 5, 6A, 6B, 6C, 6D, and 7, where similar reference characters denote corresponding features consistently throughout the figures, there are shown preferred embodiments.

FIG. 1A illustrates a block diagram of an electronic device 100 for managing launch of an application, according to an embodiment of the disclosure.

The electronic device 100 may be, for example, but not limited, to social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device or the like.

In an embodiment, the electronic device 100 includes a memory 110, a processor 120, a communicator 130, a plurality of applications 140A-140N, and an application launch manager 150.

The memory 110 stores instructions to be executed by the processor 120 for launch of the application. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit or it can be an external storage unit of the first electronic device 100, a cloud storage, or any other type of external storage.

In an embodiment, the processor 120 communicates with the memory 110, the communicator 130, the plurality of applications 140A-140N, and the application launch manager 150. The processor 120 is configured to execute instructions stored in the memory 110 and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator 130 is configured for communicating internally between internal hardware components and with external devices via one or more networks. The communicator 130 includes an electronic circuit specific to a standard that enables wired or wireless communication.

In an embodiment, the plurality of applications 140A-140N are the applications present in the electronic device 100. The plurality of applications 140A-140N may be running in the foreground or in the background. The foreground indicates that the user of the electronic device 100 is able to view the plurality of applications 140A-140N being launched and running. The background indicates that the user of the electronic device 100 is not able to view the plurality of applications 140A-140N running. In an embodiment the user of the electronic device 100 may be using some application from the plurality of applications 140A-140N and some application may be running in background. In another embodiment the user may not be using any application from the plurality of applications 140A-140N.

The application launch manager 150 is responsible for managing the launch of the plurality of applications 140A-140N on the electronic device 100.

The application launch manager 150 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the application launch manager 150 determines application/applications currently running on the electronic device 100 in foreground and being used by the user on the electronic device 100. In an embodiment, the user may not be using any application. The application launch manager 150 then monitors a plurality of user interaction parameters and a plurality of hardware parameters of the electronic device 100 while the user is using the determined application or tis not using any application.

In an embodiment the application/s being used by the user is termed as a first application. The user may use one or more application in foreground in the electronic device 100, which mean there may be more than one first application. The plurality of user interaction parameters includes a number of times the user touches a screen of the electronic device 100 and is termed as touch frequency, an orientation of a user interface (UI) of the electronic device 100, and a focused application. The focused application is the application which the user is currently using. The plurality of hardware parameters includes an on/off time of the screen of the electronic device 100, an amount of memory available in the electronic device 100, and a temperature of the electronic device 100.

The application launch manager 150 determines a next probable application to be launched/opened/used by the user of the electronic device 100 from the plurality of applications 140A-140N. There may be one or more than one probable application. The next probable application is referred as a second application hereafter in the specification.

The application launch manager 150 is responsible for pre-launching the second application in background. For pre-launching the second application in background, the application launch manager 150 inputs the plurality of monitored user interaction parameters and the plurality of hardware parameters to a pre-trained on device model. The pre-trained on device model is termed as a contextual application launch model (CAL) and determines an optimal time for pre-launching the second application. The CAL model and determination of the optimal time is explained in detail in explanation of FIG. 2. The application launch manager then 150 pre-launches the second application in the background at the determined optimal time.

In an embodiment, once the second application is pre-launched in the background, the application launch manager 150 determines a state in which the second application is to be retained in the background. The state is defined by the application launch manager 150 based on a memory available in the electronic device 100 and a size of the second application. The application launch manager 150 inputs information about the memory available in the electronic device 100 and size of the second application to an Application Final State Deterministic (AFSD) model for determining the state. Determination of the state using the AFSD model is explained in detailed in explanation to FIG. 3.

In an embodiment, the application launch manager 150 receives an event, wherein the event indicates that the second application is to be launched in the foreground. The event may be a user input to launch the second application in foreground or may be from the electronic device 100 itself for launching the second application in the foreground.

Thus, as seen above, the claimed disclosure provides the method of pre-launching the next probable application in background before launching the application in foreground and improving the user experience by reducing the application launch time and hence achieving zero-lag application launch. Further, the claimed disclosure also discloses determining specific state for retaining the application in background based on the memory of the electronic device 100 thus ensuring efficient utilization of the memory.

Although FIG. 1A shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function to managing the launch of the plurality of applications 140A-140N.

Figure 1B:
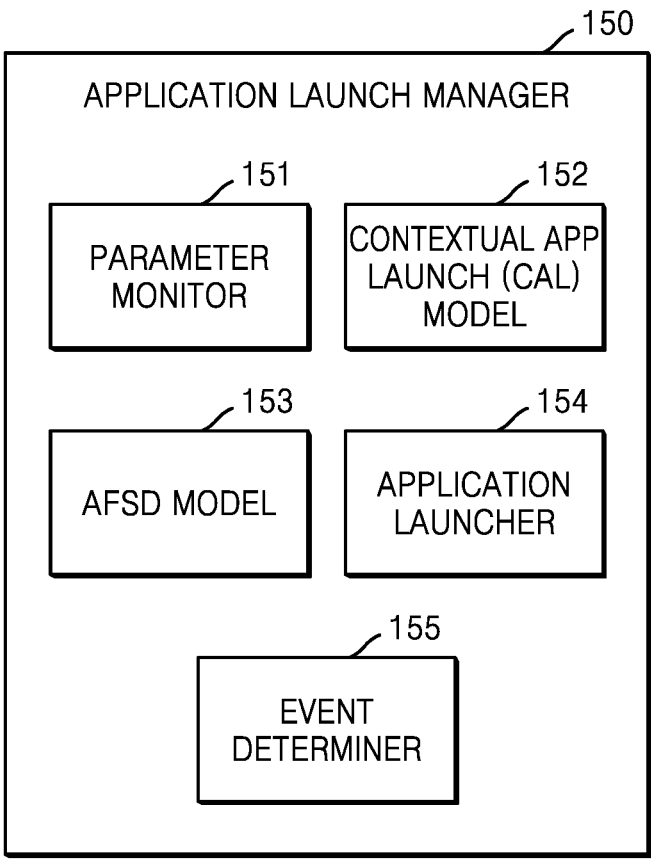
FIG. 1B illustrates a block diagram of an application manager for managing the plurality of applications, according to an embodiment of the disclosure.

FIG. 1B illustrates a block diagram of the application launch manager 150 for managing the launch of the plurality of applications 140A-140N in an electronic device 100, according to an embodiment of the disclosure.

In an embodiment, the application launch manager 150 includes a parameter monitor 151, the CAL model 152, an application launcher 154 and the Application Final State Deterministic (AFSD) model 153.

In an embodiment, the parameter monitor 151 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The parameter monitor 151 monitors the plurality of user interaction parameters and the plurality of hardware parameters when the user is using the first application. In another embodiment, the parameter monitor 151 monitors the plurality of user interaction parameters and the plurality of hardware parameters when the user is not using any application.

The plurality of user interaction parameters includes the number of times the user touches a screen of the electronic device 100, an orientation of the user interface (UI) of the electronic device 100, and a focused application. The focused application indicates the application which is being currently used by the user. In the current embodiment, the focused application is the first application. The plurality of hardware parameters includes on/off time of the screen of the electronic device 100, the amount of memory available in the electronic device 100, and the temperature of the electronic device 100. The plurality of user interaction parameters and the plurality of hardware parameters are sent to the CAL model 152.

The CAL model 152 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The CAL model 152 determines the optimal time for pre-launching the second application. In an embodiment, the CAL model 152 receives values of the plurality of user parameters and the plurality of hardware parameters. The CAL model 152 determines normalizes the received values. In an embodiment, for Screen On/Off if the screen is OFF then the value is normalized to 0 else 1. Similarly for Orientation, if the (Portrait/landscape) is normalized to (0/1), for number of times the user touches the screen (touch frequency)—the number of seconds in which the user registered a tap input, in a minute. A lower touch frequency implies lower user interaction. For memory—the percentage of RAM that is currently occupied is measured. For temperature—The electronic device's 100 current operating temperature is measure. The temperature of the electronic device 100 is in a range of [−20° C., 50° C.]. The min-max feature scaling technique is used to normalize the touch frequency, the memory availability and the temperature of the electronic device 100 and is given by Equation 1.

$$\hat{x} = x - x\ min / x\ max - x\ min \qquad \text{Equation 1}$$

In Equation 1 $\hat{x}$ is the normalized value of the parameter, x min and x max are the minimum and maximum range values of the touch frequency, the memory availability and the temperature of the electronic device 100 respectively, and x is the current recorded value of touch frequency, the memory availability and the temperature of the electronic device 100.

Mean Shift Clustering method is used for normalizing the focused app user interaction parameter, wherein the plurality of applications 140A-140N are clustered into categories based on the user interaction with the plurality of applications 140A-140N and each category is rated from 0-1, increasing with higher interaction.

After normalizing the values of the plurality of hardware parameters and the plurality of user interaction parameter, a CAL score is determined by the CAL model 152. The CAL score is determined by calculating the arithmetic mean of normalized values of the plurality of hardware parameters and the plurality of user interaction parameters. The CAL score signifies the extent of user interaction with the electronic device 100.

In order to launch the second application in background silently, user interaction should be minimal so that user doesn't face any interruptions. Thus, a CAL threshold score is defined and is compared with the calculated CAL score.

In an embodiment if the CAL score is found to be greater than the CAL threshold score then a time at which the plurality of hardware parameters and the plurality of user interaction parameter are measured is selected as the optimal time for pre-launching the second application in the background. In another embodiment, if the CAL score is found to be less than the CAL threshold score then the time at which the plurality of hardware parameters and the plurality of user interaction parameter are measured is not selected as the optimal time for pre-launching the second application in the background.

After determining the optimal time for pre-launching the second application, the application launcher 154 pre-launches the second application in background. The application launcher 154 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

After pre-launching the second application by the application launcher 154, the Application Final Stage Deterministic (AFSD) model 153 determines the state in which the second application is to be retained in the background before launching the second application in the foreground.

The AFSD model 153 defines a plurality of state for retaining the second application in the background. The plurality of states defined by the AFSD model 153 includes a stopped state, a paused state and a finished state.

In an embodiment, the AFSD model 153 determines a refreshing information of the second application. For example, the refreshing information of the second electronic device 100 determines whether the second application refreshes its data content before showing the second application to the user in foreground, whether activities of the second application to be reinitialized before launching in foreground, whether data is updated either through database or network and then redrawn with the new data. Similarly, the refreshing information includes determining whether the second application updates its User Interface (UI) during launching in foreground.

The AFSD model 153 determines whether the second application refreshes both a database and a UI of the second application or just the database or just the UI. The AFSD model 153 uses the refreshing information of the application launched in the background, a size of the second application and the memory available in the electronic device 100 for defining the plurality of states and is explained in detailed in explanation of FIG. 4.

Based on the state determined by the AFSD model 153, the second application is retained in background.

In an embodiment, the event receiver may receive an event for launching the second app in foreground. The event receiver is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the event receiver may receive an event from the user, wherein the event is a click by the user on an icon of the second application present on the UI of the electronic device 100 for launching the second application in the foreground. After receiving the event, the application launcher 154 launches the second application in the foreground.

The above described at least one of the plurality of modules/components may be implemented through an artificial intelligence (AI) model. A function associated with AI may be performed through memory 110 and the processor 120. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1B shows various hardware components of the application launch manager 150 is to be understood that other embodiments are not limited thereon. In other embodiments, the application launch manager 150 may include less or more number of components. Further, the labels or names of the components are used only for illustrative purpose and does not limit the scope of the disclosure. One or more components can be combined together to perform same or substantially similar function to manage application launching.

Figure 2:
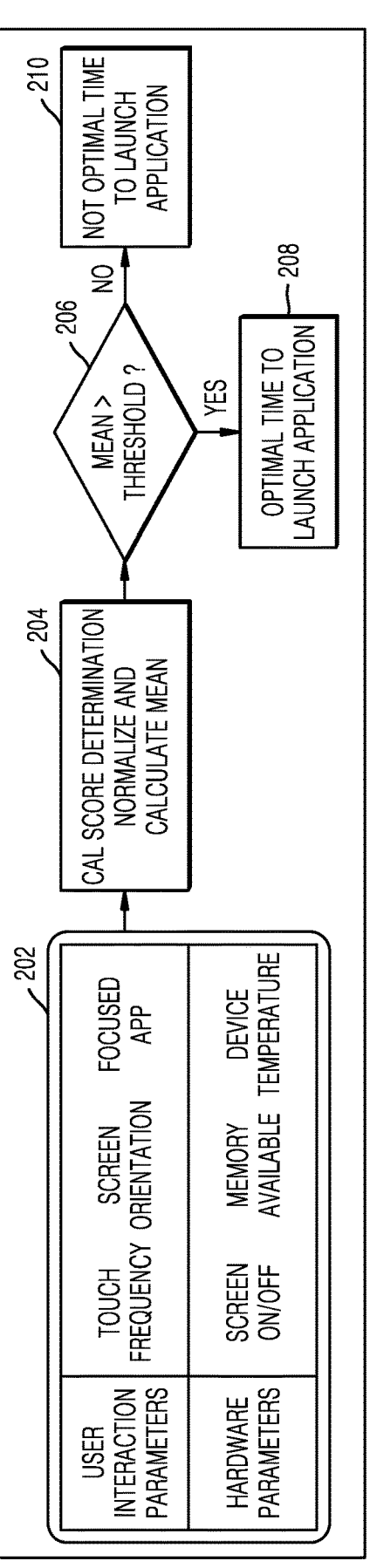
FIG. 2 is a schematic diagram, illustrating a contextual application launch model for determining an optimal time for launching a second application in background, according to an embodiment of the disclosure.

FIG. 2 is schematic diagram, illustrating the CAL model 152 for determining the optimal time for pre-launching the second application in the background, according to an embodiment of the disclosure.

Referring to FIG. 2, at operation 202, the CAL model 152 receives the plurality of user interaction parameters and the plurality of hardware parameters of the electronic device 100. At operation 204, the CAL model 152 determines the normalized value of the plurality of user interaction parameters and the plurality of hardware parameters. Further, the CAL model 152 calculates the arithmetic mean of the normalized values and the arithmetic mean is the CAL score. At operation 206, the CAL model 152 compares the determined CAL score with the threshold CAL Score. At operation 208, if the determined CAL score is greater than the threshold CAL then the time at which the plurality of user interaction parameters and the plurality of hardware parameters of the electronic device 100 are measures is said to be optimal for pre-launching the second application in background. At operation 210, the time is said to be not optimal for pre-launching the second application.

Figure 3:
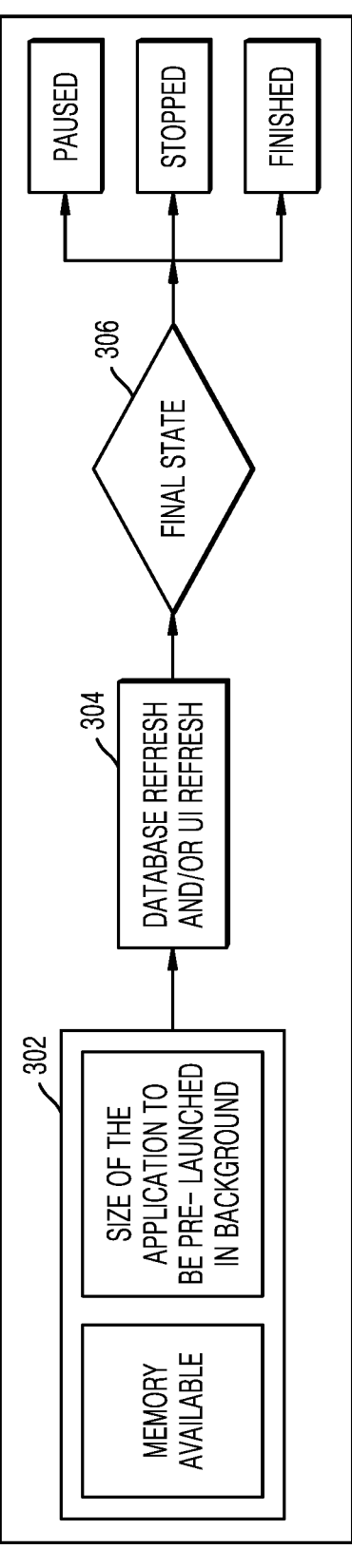
FIG. 3 is a schematic diagram, illustrating an application final state deterministic model for determining a state in which the application is to be retained after pre-launch in the background, according to an embodiment of the disclosure.

FIG. 3 is a schematic diagram, illustrating the AFSD model 153 for determining the state in which the second application is to be retained in background, according to an embodiment of the disclosure.

Referring to FIG. 3, at operation 302 the AFDS model 153 receives information about the available memory of the electronic device 100 and the size of the second application. At operation 304, the AFSD model 153 determines information about refreshing database and UI of the second application. The AFSD model 153 determines whether the second application need to refresh its database while foreground launching or the UI or both. At operation 306, based on the refreshing information and the size of the second application and the memory available in the electronic device 100, the AFSD model 153 determines the specific state for retaining the second application in the background.

Figure 4:
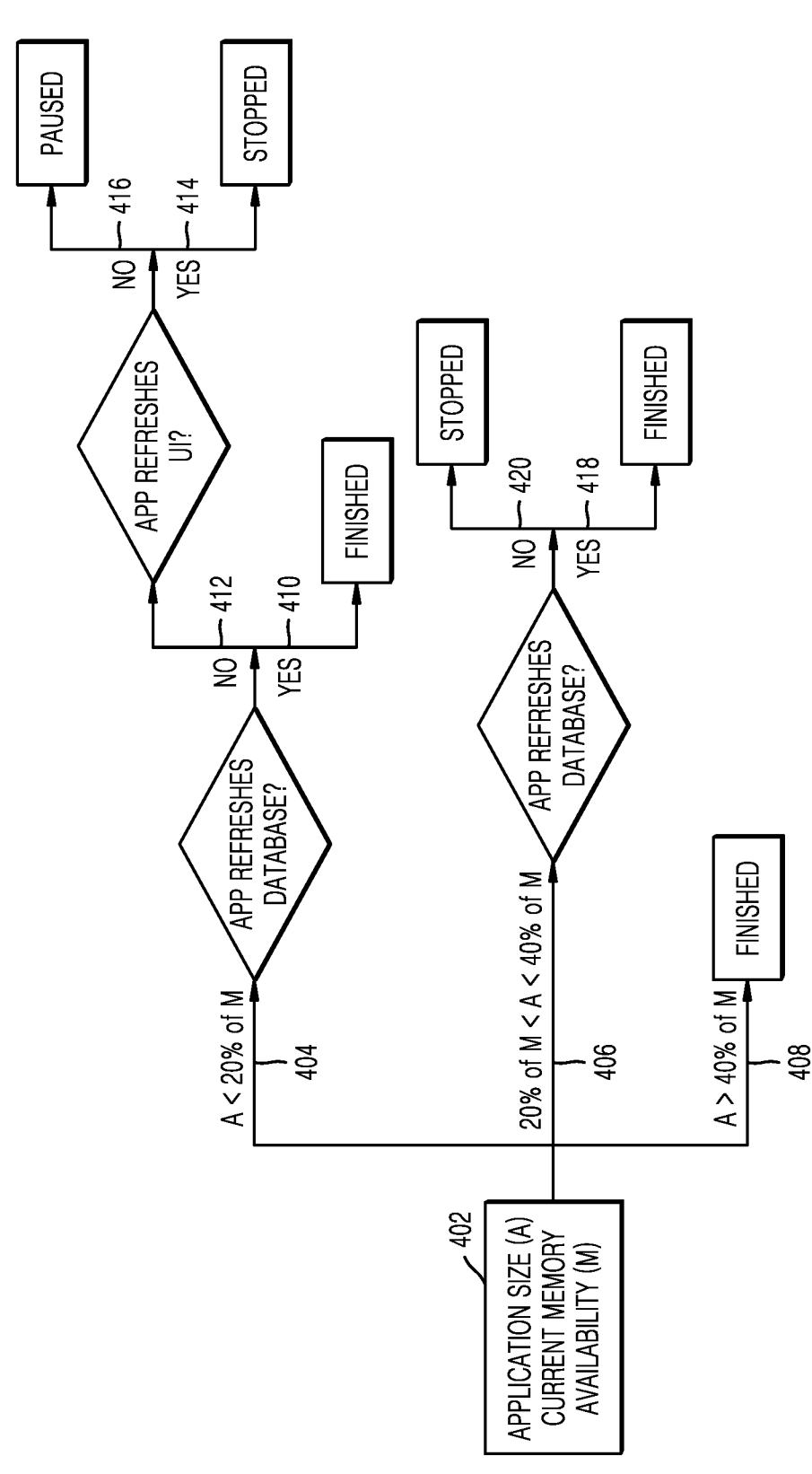
FIG. 4 is a flow diagram, illustrating a method of determining the state for retaining the second application in the background, according to an embodiment of the disclosure.

FIG. 4 is a schematic diagram illustrating a method for determining by the AFSD model 153 the state in which the second application is to be retained in background before launching in foreground, according to an embodiment of the disclosure.

As discussed earlier for determining the state, the AFSD model 153 takes the refreshing information of the refreshing information of the second application launched in the background, the size of the second application and the memory available in the electronic device 100 into consideration.

Referring to FIG. 4, at operation 402, the AFSD MODEL 153 compares the size of the second application with the available memory of the electronic device 100. In an embodiment, if a first size criteria is met then the flow proceeds to operation 404. The first size criteria includes determining if the size of the second application is less than 20% of the available memory of the electronic device 100. Thus, if the size of the second application is less than 20% of the available memory of the electronic device 100, then the flow proceeds to operation 404.

In another embodiment, if a second size criteria is met, then the flow proceeds to operation 406. The second size criteria includes determining whether the size of the second application is between 20%-40% of the available memory of the electronic device 100. Thus, if the size of the second application is between 20%-40% of the available memory of the electronic device 100, then the flow proceeds to operation 406.

In yet another embodiment, if a third size criteria is met, then the flow proceeds to operation 408. The third size criteria includes determining whether the size of the second application is greater than 40% of the available memory of the electronic device 100. Thus, if the size of the second application is greater than 40% of the available memory of the electronic device 100, then the flow proceeds to operation 408.

At operation 404, the AFSD model 153 determines whether the second application refreshes its database or not. The flow proceeds to operation 410 if the second application refreshes its database or else to operation 412. At operation 410, the AFSD model 153 selects a finished state for retaining the second application in background and the flow is stopped. At operation 412, the AFSD model 153 determined whether the second application refreshes its UI. The flow proceeds to operation 414 if the second application refreshes its UI or else to operation 416. At operation 414, the AFSD model 153 selects a paused state for retaining the second application in background and the flow is stopped. At operation 416, the AFSD model 153 selects a stopped state for retaining the second application in background and the flow is stopped.

In another embodiment, at operation 406, the AFSD model 153 determines whether the second application refreshes its database or not. The flow proceeds to operation 418 if the second application refreshes its database or else to operation 420. At operation 418, the AFSD model 153 selects the finished state for retaining the second application in background and the flow is stopped. At operation 420, the AFSD model 153 selects the stopped state for retaining the second application in background and the flow is stopped.

In yet another embodiment, at operation 408, the AFSD model 153 selects the stopped state for retaining the second application in background and the flow is stopped.

Thus, as discussed above, the paused state is the best state for retaining the second application, if minimum launch time is expected, however in the paused state the second application consumer more memory of the electronic device 100 than other states. The second application in paused state retains almost all objects and connections that are initialized by the second application such as activities, asks, and/or application specific objects and hence on foreground launch, the application launcher 154 just needs to bring the second application screen to the foreground (or a Hot launch), giving minimum launch time.

The stopped state is a middle ground where the second application is launch pretty fast, and also less memory is consumed. However, application launch time in stopped state is lower compared to paused state, but the application memory consumption is less, which is beneficial for application with large size such as games and the like. In paused state, few objects are destroyed such as the activities and corresponding objects to save memory, but several objects are retained to launch the application.

The finished state is a memory saver state, in which the application launch time is less compared to other states, but reduces the application memory consumption considerably. The finished state is beneficial when the electronic device 100 enters a memory crunch situation, where additional overhead on the electronic device 100 can cause detrimental results. In the finished state, many objects of the second application are cleared to save memory, application launch time is realized through application related objects such as process, class and libraries.

Figure 5:
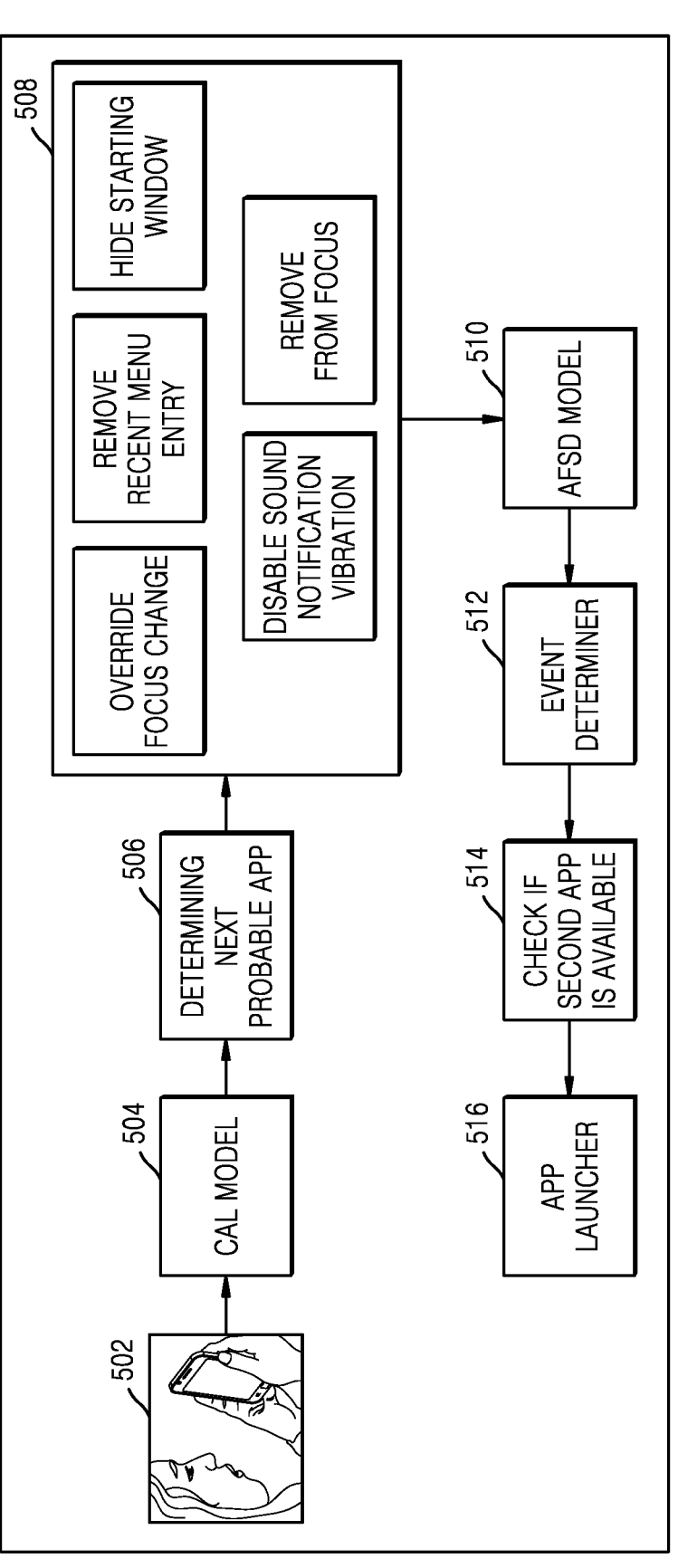
FIG. 5 is a schematic diagram, illustrating an architecture for managing the plurality of applications in the electronic device, according to an embodiment of the disclosure.

FIG. 5 is a schematic diagram, illustrating an architecture for managing launch of the plurality of applications 140A-140N in the electronic device 100, according to an embodiment of the disclosure.

Referring to FIG. 5, at operation 502, the user of the electronic device 100 is using the first application from the plurality of applications 140A-140N. At operation 504, the CAL model 152 determines the optimal time for pre-launching the second application in the background, while the user is still using the first application in foreground. At operation 506, the second application which is to be pre-launched in the background from the plurality of applications 140A-140N is determined using a next application prediction model. The next application prediction model is already known in the art. At operation 508, of the application launcher 154 configures the electronic device 100 for silently pre-launching the second application in the background such that the user is not interrupted.

In an embodiment, the application launcher 154 launches the second application. Further, a request focus for the second application is overwritten while launching the second application. A starting window for the second application is hidden and a recent menu entry of the second application is also removed. A sound, a notification and a vibration is disabled for the second application. Further, the second application is removed from a history of past launched application in the electronic device 100 after the application process is created.

At operation 510, the AFSD model 153 determines the state in which the second application is to be retained in the background. At operation 512, the electronic device 100 receives an event for launching the second application in foreground. At operation 514, the electronic device 100 checks if the second application is pre-launched in the background. At operation 516, the second application is launched in foreground by the application launcher 154.

Although FIG. 5 shows various components for managing the launch of the plurality of applications 140A-140N, is to be understood that other embodiments are not limited thereon. In other embodiments, the architecture may include less or more number of components. Further, the labels or names of the components are used only for illustrative purpose and does not limit the scope of the disclosure. One or more components can be combined together to perform same or substantially similar function to manage application launching.

FIGS. 6A to 6D are schematic diagram illustrating comparison of related art and different states in which the second application is retained in the background, according to various embodiments of the disclosure.

Figure 6A:
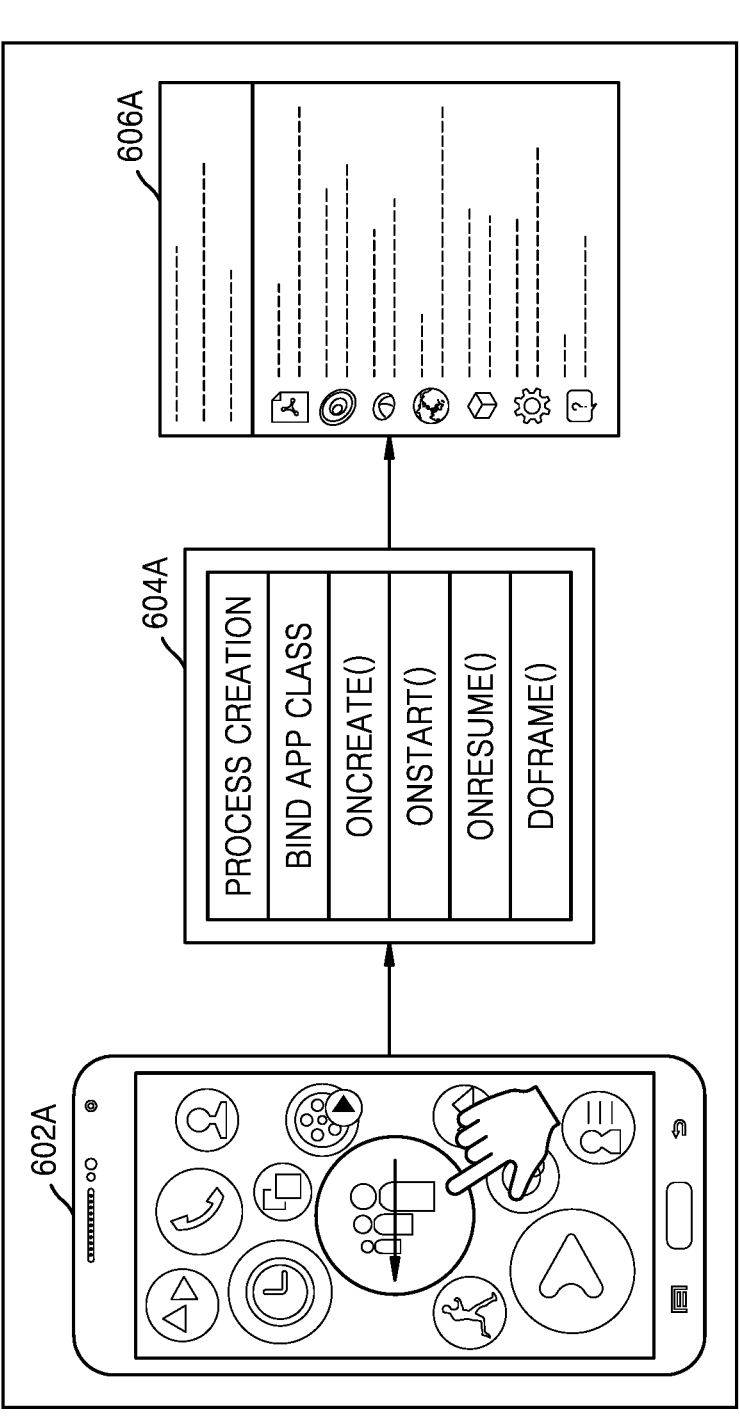
FIGS. 6A, 6B, 6C, and 6D are schematic diagram, providing a comparison between different states in which the second application is retained in the background and a related art, according to various embodiments of the disclosure.

FIG. 6A shows the different stages that needs to be executed when an application from the plurality of applications 140A-140N is launched directly in the foreground, according to a related art as disclosed herein.

Referring to FIG. 6A, 602A is a UI of the electronic device 100 indication the plurality of applications 140A-140N, 604A is the plurality of blocks that are to be executed by the application launcher 154 in order to launch the second application and 606A is the UI of the electronic device 100 after the launch of the second application. Referring to 6A, the second application which is the settings application.

As seen in 604A, the application launcher 154 has to execute a process creation block, a bin application block, an oncreate block, an onResume block, an onstart and a doframe block in order to launch the settings application in foreground.

Figure 6B:
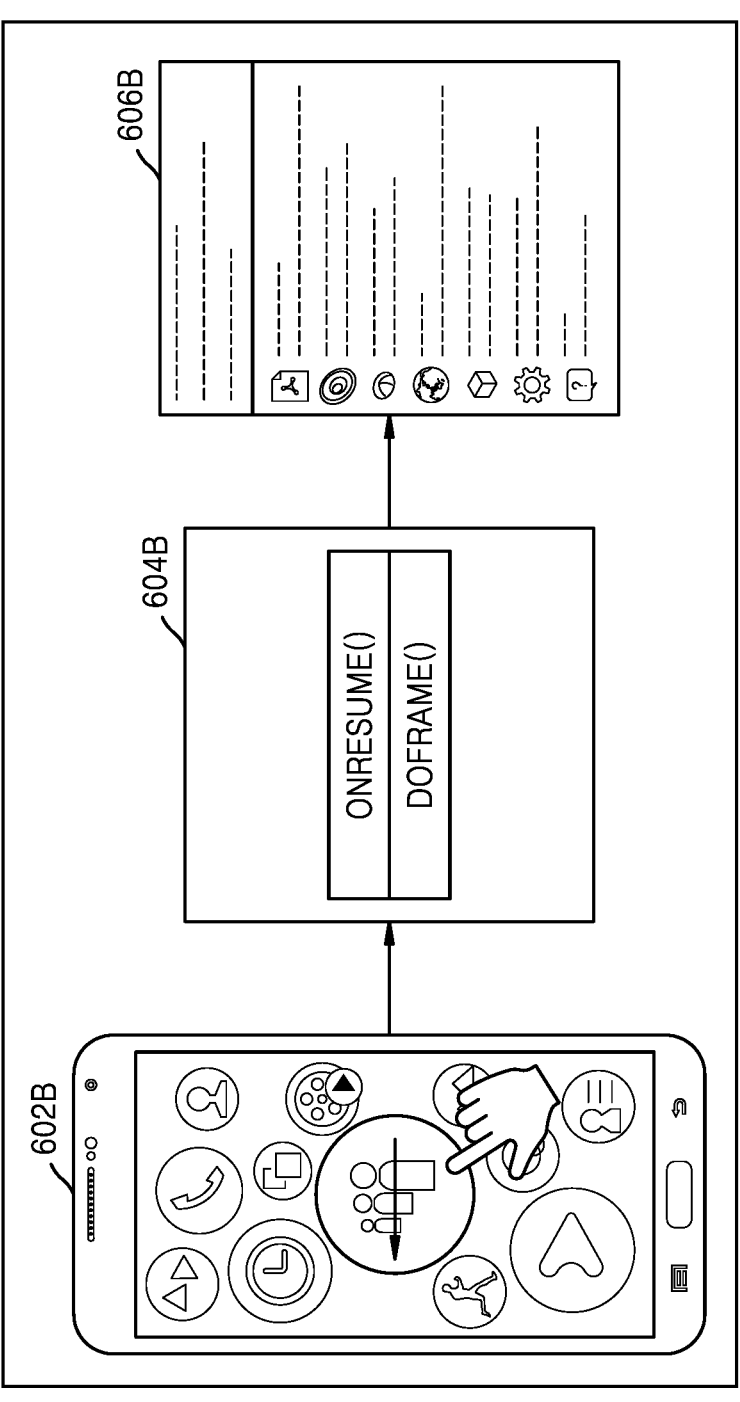

FIG. 6B shows the different stages that needs to be executed when the second application from the plurality of applications 140A-140N is pre-launched in the background and is in the paused state.

Referring to FIG. 6B, 602B is a UI of the electronic device 100, 604B is the plurality of blocks that are to be executed by the application launcher 154 when the application is pre-launched in the background and is in paused state. 606B is the UI of the electronic device 100 after the launch of the second application. Referring to FIG. 6B, the second application which is pre-launched is the settings application.

As seen in 604B, the application launcher 154 has to execute only the onResume block and the doframe block in order to launch the settings application in foreground. Thus, the time required for launching the second application in foreground is reduced considerably.

Figure 6C:
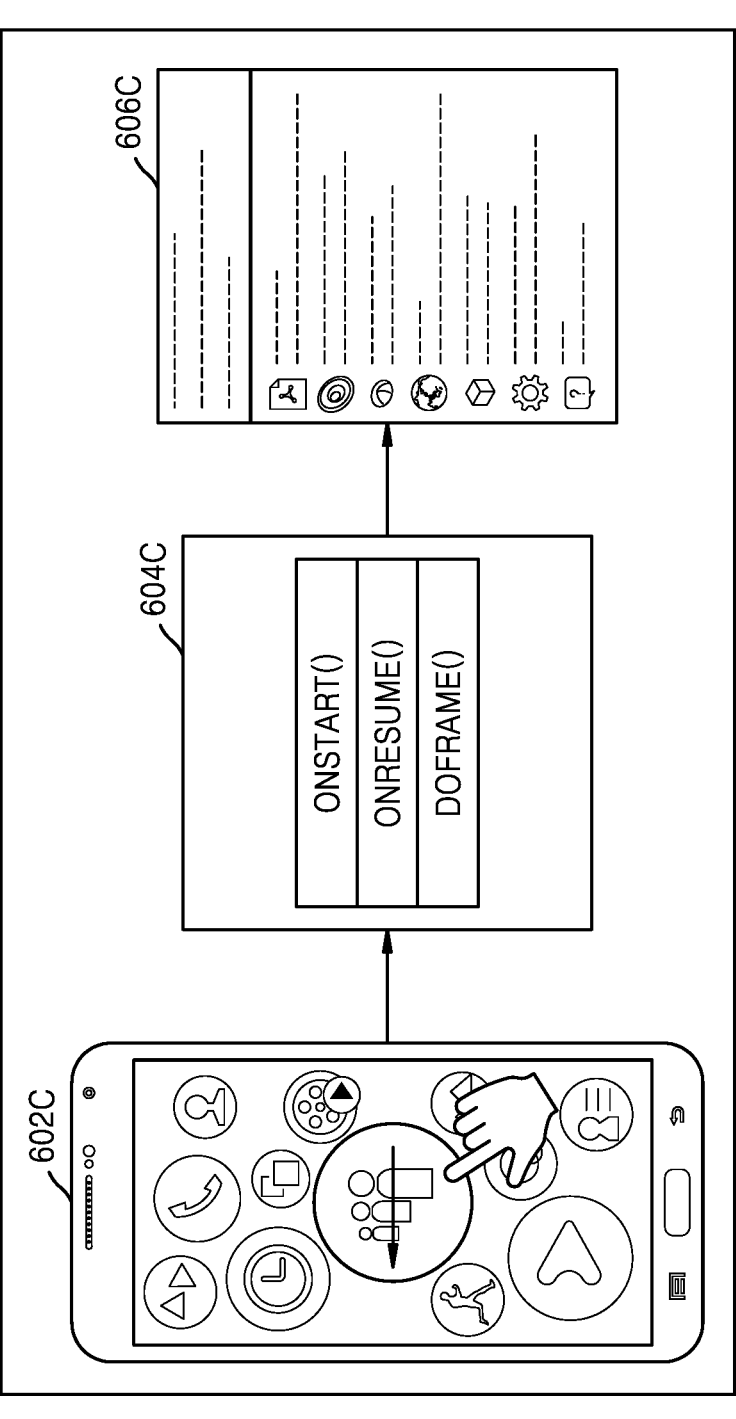

FIG. 6C shows the different stages that needs to be executed when the second application from the plurality of applications 140A-140N is pre-launched in the background and is in the stopped state.

Referring to FIG. 6C, 602C is a UI of the electronic device 100, 604C is the plurality of blocks that are to be executed by the application launcher 154 when the application is pre-launched in the background and is in stopped state. 606C is the UI of the electronic device 100 after the launch of the second application. Referring to FIG. 6C, the second application which is pre-launched is the settings application.

As seen in 604C, the application launcher 154 has to execute the onstart block along with the onResume block and the doframe block in order to launch the setting application in the foreground. Thus, the time requires for launching the second application in foreground is more than the paused stated but is still considerably less than the related art. Further, when in stopped state, the second application requires less memory than the paused state and the related art.

Figure 6D:
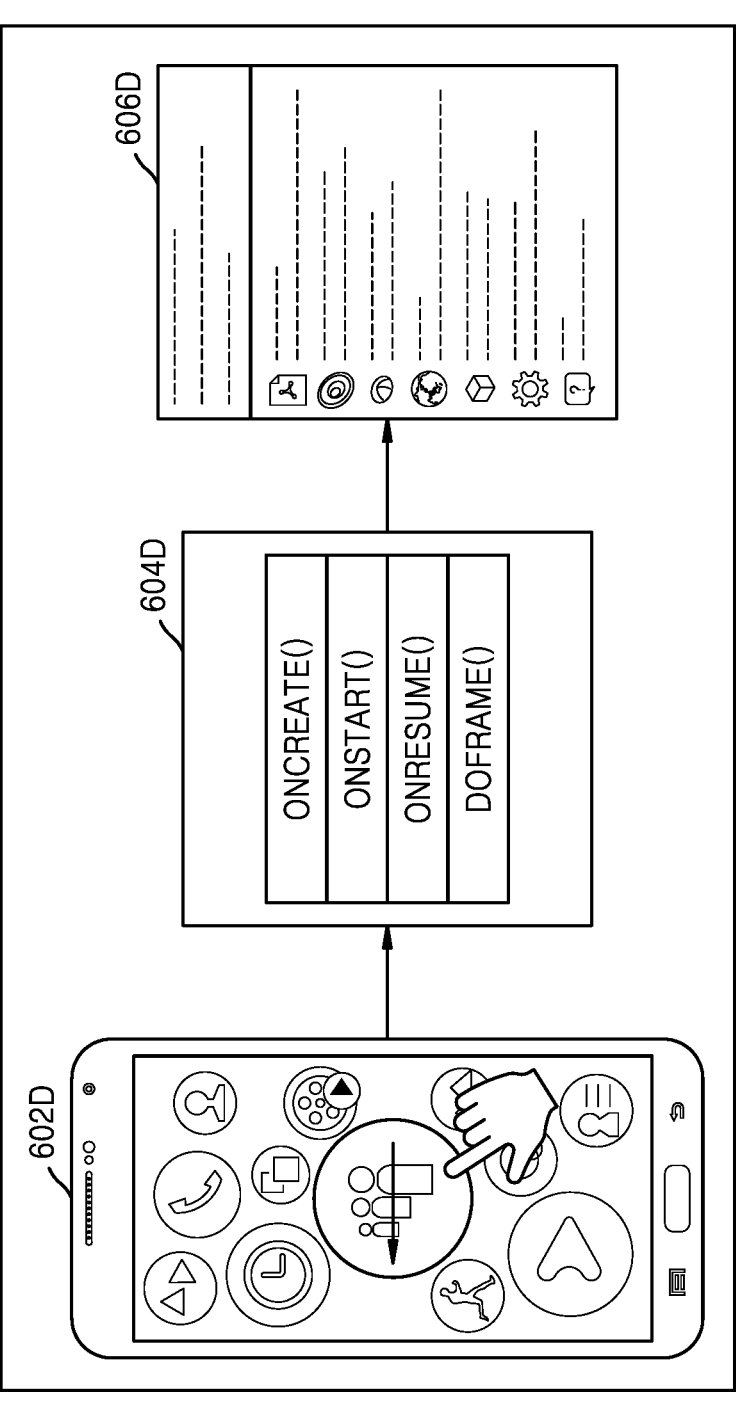

FIG. 6D shows the different stages that needs to be executed when the second application from the plurality of applications 140A-14d0N is pre-launched in the background and is in the finished state.

Referring to FIG. 6D, 602D is a UI of the electronic device 100, 604D is the plurality of blocks that are to be executed by the application launcher 154 when the application is pre-launched in the background and is in finished state. 606D is the UI of the electronic device 100 after the launch of the second application.

As seen in 604D, the application launcher 154 has to execute the oncreate block along with the onstart block, the onResume block and the doframe block in order to launch the setting application in foreground. Thus, the time requires for launching the second application in foreground is more than the stopped stated but is still considerably less than the related art. Further, when in finished state, the second application requires very less memory than the paused state, the stopped state and the related art.

Figure 7:
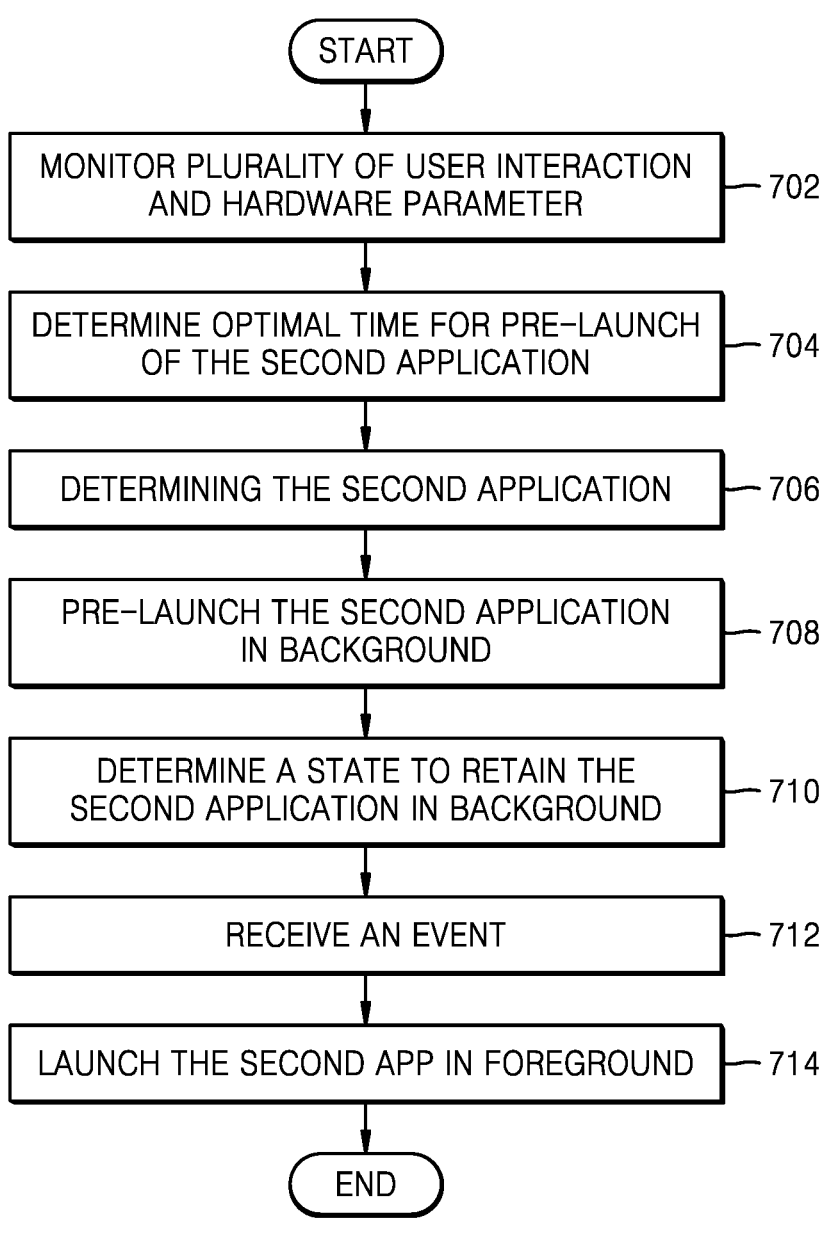
FIG. 7 is a flow diagram, illustrating the flow of meaning the plurality of applications in the electronic device, according to an embodiment of the disclosure.

FIG. 7 is a flow diagram, illustrating the method of managing the launch of the plurality of applications 140A-140N in the electronic device 100, according to an embodiment of the disclosure.

At operation 702, the method includes monitoring the plurality of user interaction parameters and the plurality of hardware parameters of the electronic device 100. In an embodiment, the parameter monitor 151 measures the values of the plurality of user interaction parameters and the plurality of hardware parameters, wherein the user of the electronic device 100 is using the first application from the plurality of applications 140A-140N. In another embodiment, the parameter monitor 151 measures the values of the plurality of user interaction parameters and the plurality of hardware parameters, wherein the user of the electronic device 100 is not using the first application from the plurality of applications 140A-140N.

At operation 704, the method includes determining that the time at which the plurality of user interaction parameters and the plurality of hardware parameters are measured is the optimal time for pre-launching the next probable application (second application) from the plurality of applications 140A-140N in the background. In an embodiment, the CAL model 152 determines the optimal time for pre-launching the second application in the background.

At operation 706, the method includes determining the second application which is to be pre-launched in the background from the plurality of applications 140A-140N present on the electronic device 100. In an embodiment, determining the second application from the plurality of applications 140A-140N is done by the method known in art.

At operation 708, the method includes pre-launching the second application in the background and configuring the electronic device 100 for silent launch of the second application. In an embodiment, the application launcher 154 pre-launches the second application in the background and configures the electronic device 100.

At operation 710, the second application pre-launched in the background is retained in the specific state from the plurality of states. The state in which the second application is retained in the background is determined by the AFSD model 153.

At operation 712, the method includes receiving by the electronic device 100 the event. The event may be from the user of the electronic device 100. In an embodiment, the event determiner 155 determines that the received event is for launching the second application in foreground.

At operation 714, the second application is launched in the foreground by the application launcher 154.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of managing application launching, the method comprising:

identifying a plurality of user interaction parameters and a plurality of hardware parameters of the electronic device while a first application is running;

identifying, by inputting the plurality of user interaction parameters and the plurality of hardware parameters to a pre-trained on-device model that determines a Contextual Application Launch (CAL) score based on normalized values of the plurality of user interaction parameters and the plurality of hardware parameters, an optimal time to pre-launch an application in a background based on the CAL score and a CAL threshold score;

identifying at least one second application which is probable to be launched;

pre-launching the at least one second application in the background at the optimal time; and launching the at least one second application in a foreground based on a user input.

2. The method of claim 1, wherein the plurality of user interaction parameters comprise at least one of a number of times a user touches a screen and an orientation of a user interface (UI).

3. The method of claim 1, wherein the plurality of hardware parameters comprise at least one of an on/off time of a screen, and a temperature of the electronic device.

4. The method of claim 1, wherein the identifying of the optimal time comprises:

identifying, using a pre-trained on-device model, a value normalized to a common scale for each of the user interaction parameters and each of the hardware parameters;

calculating, using the pre-trained on-device model, a score of the normalized value; and identifying the optimal time based on the score and a predetermined threshold.

5. The method of claim 1, wherein the pre-launching of the at least one second application in the background comprises:

overriding a request focus command while pre-launching the at least one second application in the background;

hiding a starting window for the at least one second application and removing a recent menu entry of the at least one second application;

disabling a sound, a vibration and a notification for the at least one second application; and removing the at least one second application from a history of past launched applications.

6. The method of claim 1, further comprising:

retaining the at least one second application in a state corresponding to each of the at least one second application.

7. The method of claim 6, wherein the state is identified based on at least one of:

a comparison between a size of the each of the at least one second application and available memory, and a determination on whether the at least one second application refreshes a database or UI.

8. The method of claim 6, further comprising determining the state of the at least one second application based on an output of an application final stage deterministic (AFSD) model.

9. An electronic device comprising:

memory configured to store at least one instruction; and at least one processor configured to execute the at least one instruction to:

identify a plurality of user interaction parameters and a plurality of hardware parameters of the electronic device while a first application is running, identify, by inputting the plurality of user interaction parameters and the plurality of hardware parameters to a pre-trained on-device model that determines a Contextual Application Launch (CAL) score based on normalized values of the plurality of user interaction parameters and the plurality of hardware parameters, an optimal time to pre-launch an application in a background based on the CAL score and a CAL threshold score, identify at least one second application which is probable to be launched, pre-launch the at least one second application in the background at the optimal time, and launch the at least one second application in a foreground based on a user input.

10. The electronic device of claim 9, wherein the plurality of user interaction parameter includes at least one of a number of times a user touches a screen and an orientation of a UI.

11. The electronic device of claim 9, wherein the plurality of hardware parameters comprise at least one of an on/off time of a screen, and a temperature of the electronic device.

12. The electronic device of claim 9, wherein, to identify the optimal time, the at least one processor is further configured to execute the at least one instruction to:

identify, using a pre-trained on device model, a value normalized to a common scale for each of the user interaction parameters and each of the hardware parameters;

calculate, using the pre-trained on device model, a score of the normalized value; and identify the optimal time based on the score and a predetermined threshold.

13. The electronic device of claim 9, wherein, to pre-launch the at least one second application in the background, the at least one processor is further configured to execute the at least one instruction to:

override a request focus command while pre-launching the at least one second application in the background;

hide a starting window for the at least one second application and remove a recent menu entry of the at least one second application;

disable a sound, a vibration and a notification for the at least one second application; and remove the at least one second application from a history of past launched application.

14. The electronic device of claim 9, wherein the at least one processor is further configured to execute the at least one instruction to retain the at least one second application in a state corresponding to each of the at least one second application.

15. The electronic device of claim 14, wherein the state is identified based on at least one of:

a comparison between a size of the each of the at least one second application and available memory; and a determination on whether the at least one second application refreshes a database or UI.

16. One or more non-transitory computer-readable storage media storing one or more computer programs including computer-executable instructions, that, when executed by at least one processor of an electronic device individually or collectively, cause the electronic device to perform operations, the operations comprising:

identifying a plurality of user interaction parameters and a plurality of hardware parameters of the electronic device while a first application is running;

identifying, by inputting the plurality of user interaction parameters and the plurality of hardware parameters to a pre-trained on-device model that determines a Contextual Application Launch (CAL) score based on normalized values of the plurality of user interaction parameters and the plurality of hardware parameters, an optimal time to pre-launch an application in a background based on the CAL score and a CAL threshold score;

identifying at least one second application which is probable to be launched;

pre-launching the at least one second application in the background at the optimal time; and launching the at least one second application in a foreground based on a user input.

* * * * *